United States Patent Office 3,239,536
Patented Mar. 8, 1966

3,239,536
QUATERNARY HYDRAZINO-SUBSTITUTED
COPPER PHTHALOCYANINE DYESTUFFS
Ian Knowles Barben, Richard Budziarek, Victor David
Poole, and Cecil Vivian Stead, Manchester, England,
assignors to Imperial Chemical Industries Limited,
London, England, a corporation of Great Britain
No Drawing. Filed May 6, 1963, Ser. No. 278,472
Claims priority, application Great Britain, May 15, 1962,
18,681/62
2 Claims. (Cl. 260—314.5)

This invention relates to new dyestuffs and more particularly it relates to new phthalocyanine dyestuffs which are valuabe for colouring textile materials.

According to the invention there are provided the phthalocyanine dyestuffs which, in the form of the free acids, are represented by the formula:

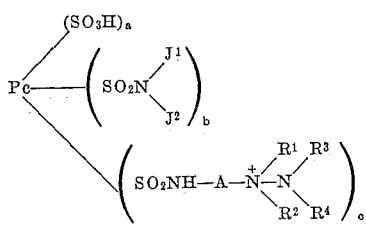

wherein Pc represents a phthalocyanine radical; $J^1$ and $J^2$ each independently represents a hydrogen atom or a lower alkyl, hydroxy lower alkyl or sulphoethyl group; A represents an ethylene or $\beta$-hydroxytrimethylene radical; $R^1$ and $R^2$ each represent a methyl radical and $R^3$ and $R^4$ each independently represents a hydrogen atom or a methyl radical, or when $R^3$ and $R^4$ each represents hydrogen atoms, $R^1$ and $R^2$ are joined together to form a tetramethylene or pentamethylene radical, or $R^1$ and $R^3$ and $R^2$ and $R^4$ are joined together to form in each case a trimethylene radical; and $a$ represents a value of from 1 to 3, $b$ represents a value of from 0 to 2 and $c$ represents a value of from 1 to 2, provided that the sum of $a$, $b$, and $c$ does not exceed 4.

Each of the sulphonic acid and substituted or unsubstituted sulphonamide groups present in the phthalocyanine dyestuffs of the invention is directly attached to a carbon atom which is in the 3- or 4-position of the benz rings present in the phthalocyanine radical represented by Pc. The said phthalocyanine radical may be metal-free but preferably it is a stable metal-containing phthalocyanine radical such as a cobalt phthalocyanine or nickel phthalocyanine radical and, above all, a copper phthalocyanine radical.

It is preferred that $R^1$ and $R^2$ each represent a methyl radical, and that $R^3$ and $R^4$ each represent a hydrogen atom.

The dyestuffs of the invention are generally obtained in the form of mixtures and accordingly the values of $a$, $b$ and $c$ represent the statistical values of the numbers of the different types of groups present in the final products.

Throughout this specification the term "lower alkyl" is used to denote alkyl radicals containing from 1 to 4 carbon atoms.

As examples of the lower alkyl groups represented by $J^1$ and $J^2$ there may be mentioned methyl and ethyl groups, and as an example of a hydroxy lower alkyl group represented by $J^1$ and $J^2$ there may be mentioned the $\beta$-hydroxyethyl group. It is however preferred that $J^1$ and $J^2$ each represent a hydrogen atom.

According to a further feature of the invention there is provided a process for the manufacture of the phthalocyanine dyestuffs, as hereinbefore defined, which comprises reacting a phthalocyanine compound of the formula:

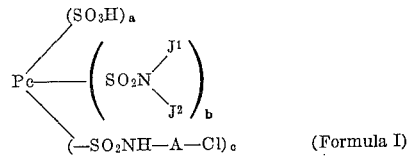
(Formula I)

with a hydrazine of the formula:

$$N\begin{array}{c}R^1\\\diagdown\\R^2\end{array}\!\!-\!\!N\begin{array}{c}R^3\\\diagup\\R^4\end{array}$$

(Formula II)

wherein Pc, A, $J^1$, $J^2$, $R^1$, $R^2$, $R^3$, $R^4$, $a$, $b$ and $c$ have the meanings stated above.

The process of the invention may be conveniently brought about by stirring the reactants together in water, or in a mixture of water and a water-miscible organic liquid, preferably at a temperature between 0° and 100° C., and isolating, by conventional methods, the resulting dyestuff.

As examples of the hydrazines of Formula II there may be mentioned N:N:N'-trimethylhydrazine, N:N:N':N'-tetramethylhydrazine, N-aminopiperidine, N-aminopyrrolidine, 1:5-diazabicyclo-(0:3:3)-octane, and, preferably, N:N-di-methylhydrazine.

The phthalocyanine compounds of Formula I may themselves be obtained by reacting an aqueous suspension of a phthalocyanine sulphonchloride of the formula:

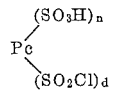

wherein Pc has the meaning stated above, $n$ has a value of 0 to 3 and $d$ has a value of from 1 to 4, provided that $n+d$ does not exceed 4, with $\beta$-chloroethylamine or $\gamma$-chloro-$\beta$-hydroxypropylamine optionally in the presence of an amine of the formula:

(Formula III)

and when $n$ is less than $a$ hydrolysing those sulphonchloride groups which have not been reacted with the amines to sulphonic acid groups.

As examples of the amines of Formula III there may be mentioned methylamine, ethylamine, dimethylamine, diethylamine, $\beta$-hydroxyethylamine, di($\beta$-hydroxyethyl)amine, taurine, N-methyl-N-($\beta$-hydroxyethyl)amine, and, above all, ammonia.

The phthalocyanine sulphonchlorides of the above formula may themselves be obtained by treating the corresponding phthalocyanines or phthalocyanine sulphonic acids with chlorosulphonic acid optionally in the presence of carbon tetrachloride or an acid halide such as thionyl chloride, sulphuryl chloride, phosphorus pentachloride, phosphorus oxychloride or phosphorus trichloride.

Specific examples of the phthalocyanine compounds of Formula I are described in British specification Nos. 826,689, 921,050 and 921,425.

One preferred class of the phthalocyanine dyestuffs of the invention are the phthalocynine dyestuffs which, in the form of the free acids, are represented by the formula:

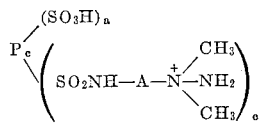

wherein Pc, A, $a$ and $c$ have the meanings stated, provided that the sum of $a$ and $c$ does not exceed 4.

A second preferred class of the phthalocyanine dyestuffs of the invention are the phthalocyanine dyestuffs which, in the form of the free acids, are represented by the formula:

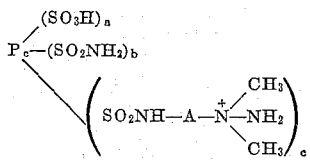

wherein Pc, A, $a$, $b$ and $c$ have the meanings stated.

In the above classes it is further preferred that Pc represents a copper phthalocyanine radical, and that A represents the ethylene radical.

The phthalocyanine dyestuffs of the invention are particularly valuabe for colouring cellulose textile materials such as textile materials of cotton, linen or viscose rayon. The phthalocyanine dyestuffs can be applied to the said textile materials by dyeing, padding or printing processes, using in the latter case printing pastes which contain a thickening agent. The phthalocyanine dyestuffs are preferably applied to the textile materials in conjunction with a treatment with an acid-binding agent, for example, sodium carbonate, sodium metasilicate, trisodium phosphate or sodium hydroxide, which may be applied to the textile material before, during or atfer the application of the dyestuff. Alternatively when the dyed textile material is to be subsequently heated or steamed a substance, such as sodium bicarbonate or sodium trichloroacetate, can be used which on heating or steaming liberates an acid-binding agent.

The phthalocyanine dyestuffs of the invention colour cellulose textile materials in heavy depths of shade and the turquoise blue shades so obtained have excellent fastness to light and to wet treatments such as washing.

The invention is illustrated but not limited by the following examples in which the parts are by weight.

*Example 1*

A solution of 5 parts of N:N-dimethylhydrazine in 30 parts of water is added to a solution of 30 parts of copper phthalocyanine 3-(N-β-chloroethylsulphamyl)$_{1.8}$-3-(sulphonic acid)$_{2.2}$, which is the dyestuff of Example 7 of British specification No. 826,689, in 260 parts of water, and the resulting mixture is then stirred for 10 hours at 70° to 80° C. The mixture is cooled to 20° C., poured into 1500 parts of acetone, and the precipitated dyestuff is filtered off, washed with acetone and dried.

When applied to cellulose textile materials in conjunction with a treatment with an acid-binding agent the dyestuff yields turquoise blue shades possessing excellent fastness to light and to wet treatments.

*Example 2*

In place of the 30 parts of the copper phthalocyanine derivative used in Example 1 there are used 17 parts of copper phthalocyanine 3-(sulphonamide)$_{1.3}$-3 - (N - β-chloroethylsulphonamide)$_{1.5}$-3-(sulphonic acid)$_{1.2}$, which was obtained as described below, whereby a dyestuff is obtained which dyes cellulose textile materials in torquoise blue shades possessing excellent fastness to light and to wet treatments.

The copper phthalocyanine derivative used in this example was obtained as follows:

115.2 parts of copper phthalocyanine were slowly added with stirring to 540 parts of chlorosulphonic acid and the mixture was then stirred for 3 hours at a temperature between 140° and 145° C. The mixture was cooled to 80° C., 100 parts of thionylchloride added and the mixture was then stirred for 2 hours at a temperature of 85° C. The mixture was cooled to 20° C., poured into ice and the precipitated phthalocyanine suphonchloride was filtered off and washed with 1000 parts of a 1% aqueous solution of hydrochloric acid which had been cooled to 0° C.

The paste of sulphonchloride so obtained which consisted essentially of copper phthalocyanine 3-trisulphonchloride 3-sulphonic acid was stirred with 1000 parts of water and 600 parts of ice and 170.4 parts of a 20.4% aqueous solution of β-chloroethylamine hydrochloride were then added. The pH of the resutlant mixture was adjusted to 8 by the addition of a 2 N aqueous solution of ammonium hydroxide and the temperature of the mixture was then raised to 50° C. during 1 hour and maintained at 50° C. for 15 minutes, the pH of the mixture being maintained at 8 by further additions of a 2 N aqueous solution of ammonium hydroxide. The solution so obtained was cooled to 20° C. and was acidified to pH 3 by the addition of a concentrated aqueous solution of hydrochloric acid. The precipitated compound was then filtered off, washed with a 1% aqueous solution of hydrochloric acid and dried at 50° C.

*Example 3*

In place of the 5 parts of N:N-dimethylhydrazine used in Examples 1 and 2 there are used equivalent amounts of N:N:N'-trimethylhydrazine, N:N:N':N' - tetramethylhydrazine, N-aminopiperidine, N-aminopyrrolidine or 1:5-diazabicyclo-(0:3:3)-octane when similar dyestuffs are obtained.

*Example 4*

In place of the 30 parts of the copper phthalocyanine derivative used in Examples 1 or 3 there are used 18 parts of copper phthalocyanine 3-(sulphonamide)$_{1.2}$-3-[sulphon - N - (γ - chloro-β-hydroxypropyl)amide]$_{1.3}$-3-sulphonic acid)$_{1.5}$, which is the dyestuff of Example 2 of British specification No. 921,050, or 18 parts of copper phthalocyanine - 4 - (sulphonamide)$_{1.2}$-4-[sulphon-N-(γ-chloro-β-hydroxypropyl)amide]$_{1.4}$-4-(sulphonic acid)$_{1.4}$, which is the dyestuff of Example 15 of British specification No. 921,050, whereby dyestuffs are obtained which give turquoise blue colourations on cellulose textile materials which possess excellent fastness properties to light and to wet treatments.

*Example 5*

In place of the 17 parts of the copper phthalocyanine derivative used in Example 2 or 3 there are used 17 parts of the copper phthalocyanine derivatives which are obtained by the method described in Example 2 for the preparation of copper phthalocyanine 3 - (sulphonamide)$_{1.3}$ - 3 - (N - β - chloroethylsulphonamide)$_{1.5}$ - 3 - (sulphonic acid)$_{1.2}$ except that the 2 N aqueous solution of ammonium hydroxide was replaced by 10% aqueous solutions of methylamine, dimethylamine, sodium salt of taurine, N-(β-hydroxyethyl)-amine or N:N-di(β-hydroxyethyl)amine respectively, whereby similar dyestuffs are obtained.

What we claim is:

1. The phthalocyanine dyestuffs which are represented by the formula:

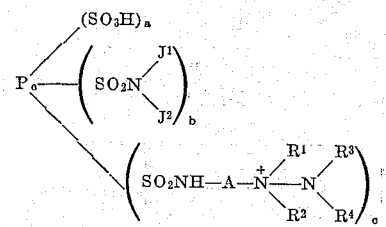

wherein Pc represents a copper phthalocyanine radical; $J^1$ and $J^2$ each independently represent a member selected from the class consisting of hydrogen, lower alkyl, hydroxy lower alkyl and sulphoethyl;

A represents a divalent radical selected from the class consisting of ethylene and β-hydroxytrimethylene radicals;

$R^1$ and $R^2$ each represent a methyl radical and $R^3$ and $R^4$ each independently represent a member selected from the class consisting of hydrogen and methyl, and when $R^3$ and $R^4$ each represent a hydrogen atom, $R^1$ and $R^3$ are joined together to form a divalent radical selected from the class consisting of tetramethylene and pentamethylene radicals, and when $R^1$ and $R^3$ and $R^2$ and $R^4$ are joined together they form in each case a trimethylene radical;

and $a$ represents a value of from 1 to 3, $b$ represents a value of from 0 to 2, and $c$ represents a value of from 1 to 2, provided that $a+b+c$ does not exceed 4, the anion being chlorine.

2. The phthalocyanine dyestuffs which are represented by the formula:

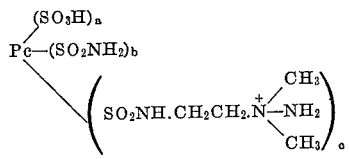

wherein Pc represents a copper phthalocyanine radical: $a$ represents a value of from 1 to 3, $b$ represents a value of from 0 to 2, and $c$ represents a value of from 1 to 2, provided that $a+b+c$ does not exceed 4, the anion being chlorine.

References Cited by the Examiner
UNITED STATES PATENTS

| | | | |
|---|---|---|---|
| 2,542,327 | 2/1951 | Haddock et al. | 260—314.5 |
| 2,823,205 | 2/1958 | Lacey et al. | 260—314.5 |

FOREIGN PATENTS 770,784   3/1957   Great Britain.

WALTER A. MODANCE, *Primary Examiner.*

JAMES A. PATTEN, *Assistant Examiner.*